Patented May 23, 1933

1,910,010

UNITED STATES PATENT OFFICE

HANS GEORG GRIMM, OF HEIDELBERG, AND EKBERT LEDERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

CHROME YELLOW COLORING MATTER

No Drawing. Application filed February 24, 1931, Serial No. 518,025, and in Germany March 3, 1930.

The present invention relates to chrome yellow coloring matters containing mixed crystals of lead chromate and barium or strontium chromate or both these chromates.

We have found that chrome yellow coloring matters which are equally as good as the commercial chrome yellow coloring matters, which consist of lead chromate and lead sulphate, as regards their stability to light and chemical influences and are superior thereto as regards strength of color are obtained by precipitating lead chromate together with strontium chromate or barium chromate or both. By the simultaneous precipitation of the chromates, mixed crystals are formed which have considerable advantages as regards their chemical properties and especially their tinctorial properties, such as brilliancy, covering power and color strength, contrasted with purely mechanical mixtures.

If, moreover, a part of the chromate be isomorphously replaced by sulphate, mixed crystals are obtained the color of which has a considerably greater strength and brilliance than that of mixtures of lead chromate yellow with heavy spar for example. The tinctorial properties of the mixed crystals thus obtained are practically the same as those of pure commercial chrome yellow coloring matters.

In this manner it is possible to replace a great part of the poisonous lead by the considerably less poisonous barium or strontium and to replace a very great part of the sensitive and expensive chromate by the considerably cheaper sulphate.

A further advantage consists in the fact that litharge may be used as the initial material, this being directly converted with the alkaline earth chlorides and the coloring matter being directly obtained by precipitation with a sulphate chromate solution after a previous neutralization or with a simultaneous neutralization. Contrasted with the usual process of converting litharge with common salt, the said method has the advantage that the filtering of the reaction mass and the thorough washing to remove foreign salts with the simultaneous loss of material are avoided.

Furthermore, it is possible to obtain an orange-shaded yellow by precipitating the coloring matter from alkaline reaction solutions. These chrome orange coloring matters, which contain a considerable part of strontium or barium chromate, are especially suitable for coloring cement since they are less liable to cause an efflorescence of the cement by reason of their small content of lead. The chrome yellow coloring matters prepared as hereinbefore described may be adulterated with substrata or fillers to a considerable extent by reason of their great strength of color.

The following examples will further illustrate the nature of this invention but the invention is not restricted to these examples. The parts are by weight.

Example 1

For the preparation of chrome yellow having the composition $Pb_{0.2}Sr_{0.8}CrO_4$, 66 parts of lead nitrate and 227 parts of strontium nitrate (crystalline) are dissolved in 2,500 parts of water. A solution of 342.2 parts of sodium chromate in 2,500 parts of water is added to the resulting solution. After decanting several times, the precipitate is filtered off and dried. A lemon yellow coloring matter is obtained having an extremely fine state of dispersion (shaking weight 0.4 kilogram per litre).

Example 2

For the preparation of chrome yellow having the composition $Pb_{0.4}Sr_{0.6}(Cr_{0.1}S_{0.9})O_4$, 132 parts of lead nitrate and 127 parts of strontium nitrate are dissolved in 2,500 parts of water and the coloring matter is precipitated by the addition of a solution of 34 parts of sodium chromate and 290 parts of Glauber's salt in 2,500 parts of water. The solution is decanted and the precipitate filtered off and dried. A beautiful bright yellow coloring matter having very good stability is obtained.

Example 3

For the preparation of chrome yellow having the composition $Pb_{0.2}Ba_{0.8}(Cr_{0.3}S_{0.7})O_4$, 446.4 parts of litharge are stirred while warming with a concentrated aqueous solution of 1,956 parts of barium chloride. After neutralizing the solution, or while simultaneously neutralizing the solution, the coloring matter is precipitated by the addition of a solution of 1,030 parts of sodium chromate and 2,250 parts of Glauber's salt in 2,500 parts of water. After decanting the solution several times the precipitate is filtered off and dried. A beautiful greenish yellow coloring matter having good tinctorial properties is obtained.

*Example 4*

For the preparation of a chrome yellow from mixed crystals of the composition $Pb_{0.4}Sr_{0.6}(S_{0.95}Cr_{0.05})O_4$ a solution of 141.6 parts of lead acetate and 126.9 parts of strontium nitrate in 3,000 parts of water is mixed with a solution of 301.3 parts of Glauber's salt and 17.1 parts of sodium chromate in 4,000 parts of water. The precipitate is filtered, washed and dried in the air. A lemon yellow pigment of extremely fine dispersion, good covering power and great strength is obtained.

*Example 5*

For the preparation of chrome orange of the composition $PbO.(Pb_{0.5}Sr_{0.5})CrO_4$, 1,280 parts of litharge are stirred to a thick paste with 240 parts of strontium chloride and 330 parts of common salt with an addition of water. When the conversion is completed the whole is heated to 100° C. and a solution of 635 parts of sodium chromate in 2,000 parts of water is added. A beautiful, brilliant, yellowish chrome orange is obtained.

*Example 6*

For the preparation of chrome yellow having the composition $Pb_{0.8}Ba_{0.2}(Cr_{0.6}S_{0.4})O_4$, 2,075 parts of white lead and 395 parts of barium carbonate are made into an aqueous paste which is gradually introduced, while stirring, into a solution of 1,577 parts of a nitric acid of 80 percent strength in 50,000 parts of water. Precipitation is effected by the addition of a solution of 580 parts of anhydrous sodium sulphate and 1,165 parts of potassium chromate in 50,000 parts of water. The precipitate is filtered off, washed and dried at about 100° C. A yellow pigment of an excellent color strength and covering power is thus obtained.

What we claim is:

1. As new articles of manufacture chrome yellow coloring matters comprising mixed crystals of chromates of lead and at least one metal selected from the group consisting of barium and strontium.

2. As new articles of manufacture chrome yellow coloring matters comprising mixed crystals of chromate and sulphate of lead and at least one metal selected from the group consisting of barum and strontium.

3. As a new article of manufacture a chrome yellow coloring matter comprising mixed crystals substantially of the composition $Pb_{0.8}Ba_{0.2}(Cr_{0.6}S_{0.4})O_4$.

4. As a new article of manufacture a chrome yellow coloring matter comprising mixed crystals substantially of the composition $Pb_{0.2}Ba_{0.8}(Cr_{0.3}S_{0.7})O_4$.

5. As a new article of manufacture a chrome yellow coloring matter comprising mixed crystals substantially of the composition $Pb_{0.4}Sr_{0.6}(Cr_{0.1}S_{0.9})O_4$.

In testimony whereof we have hereunto set our hands.

HANS GEORG GRIMM.
EKBERT LEDERLE.